United States Patent
Yebka et al.

(10) Patent No.: US 9,811,180 B2
(45) Date of Patent: Nov. 7, 2017

(54) INPUT DEVICE WITH GAS VENT(S)

(71) Applicant: Lenovo (Singapore) Pte. Ltd., New Tech Park (SG)

(72) Inventors: Bouziane Yebka, Apex, NC (US); Joseph Anthony Holung, Wake Forest, NC (US); Tin-Lup Wong, Chapel Hill, NC (US); Philip John Jakes, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 326 days.

(21) Appl. No.: 14/658,624

(22) Filed: Mar. 16, 2015

(65) Prior Publication Data

US 2016/0274682 A1 Sep. 22, 2016

(51) Int. Cl.
*G06F 3/0354* (2013.01)
*H01M 2/10* (2006.01)
*H01M 2/34* (2006.01)

(52) U.S. Cl.
CPC ...... *G06F 3/03545* (2013.01); *H01M 2/1055* (2013.01); *H01M 2/345* (2013.01)

(58) Field of Classification Search
None
See application file for complete search history.

(56) References Cited

U.S. PATENT DOCUMENTS

| | | |
|---|---|---|
| 2,314,203 A | 3/1943 | Edward |
| 2,548,558 A | 4/1951 | Raney |
| 3,257,238 A | 6/1966 | Georges |
| 3,370,298 A | 2/1968 | Rodriguez |
| 3,558,356 A | 1/1971 | Jost |
| 3,575,730 A | 4/1971 | Doll |
| 3,784,411 A | 1/1974 | Ciliberti |
| 3,877,991 A | 4/1975 | Fujikawa |
| 3,943,007 A | 3/1976 | Lebrun |
| 4,121,017 A | 10/1978 | Dougherty et al. |
| 4,149,649 A | 4/1979 | Szego |
| 4,303,876 A | 12/1981 | Kelly et al. |
| 4,610,370 A | 9/1986 | Patterson et al. |

(Continued)

FOREIGN PATENT DOCUMENTS

| | | |
|---|---|---|
| CN | 1713435 A | 12/2005 |
| JP | 2004355914 | 12/2004 |

(Continued)

OTHER PUBLICATIONS

Joseph Anthony Holung, Tin-Lup Wong, Bouziane Yebka, "Battery Cell Containment and Venting", related U.S. Appl. No. 12/327,132. Applicant's Appeal Brief filed Jul. 27, 2015 in response to the Final Office Action dated Jun. 19, 2015.

(Continued)

*Primary Examiner* — Seokyun Moon
(74) *Attorney, Agent, or Firm* — John L. Rogitz; John M. Rogitz

(57) ABSTRACT

In one aspect, an input device includes a housing, an element on at least a portion of the housing for providing input to a touch-enabled display, a battery compartment in the housing in which a battery may be positioned, and a vent through the housing which permits gas from the battery to pass to exterior to the housing.

20 Claims, 12 Drawing Sheets

(56) References Cited

U.S. PATENT DOCUMENTS

| | | | |
|---|---|---|---|
| 5,554,455 A * | 9/1996 | Inoue | H01M 2/1229 429/53 |
| 5,563,364 A | 10/1996 | Alhamad | |
| 5,747,188 A | 5/1998 | Sacken et al. | |
| 5,759,714 A | 6/1998 | Matsufuji et al. | |
| 6,027,831 A | 2/2000 | Inoue et al. | |
| 6,677,078 B2 | 1/2004 | Reise et al. | |
| 6,737,591 B1 * | 5/2004 | Lapstun | G06F 3/03545 178/18.03 |
| 7,189,473 B2 | 3/2007 | Smith et al. | |
| 8,012,619 B2 | 9/2011 | Carlson et al. | |
| 8,163,408 B2 | 4/2012 | Holung et al. | |
| 8,298,693 B2 | 10/2012 | Holung et al. | |
| 8,512,893 B2 | 8/2013 | Carlson et al. | |
| 2001/0036571 A1 | 11/2001 | Oogami et al. | |
| 2003/0082439 A1 | 5/2003 | Sakakibara | |
| 2003/0148175 A1 | 8/2003 | Iwanaga et al. | |
| 2006/0251962 A1 | 11/2006 | Kim | |
| 2006/0275659 A1 | 12/2006 | Kim et al. | |
| 2007/0154789 A1 | 7/2007 | Chang et al. | |
| 2008/0042618 A1 | 2/2008 | Cromer et al. | |
| 2008/0196956 A1 | 8/2008 | Koenekamp et al. | |
| 2010/0047673 A1 * | 2/2010 | Hirakawa | H01M 2/105 429/54 |

FOREIGN PATENT DOCUMENTS

| | | |
|---|---|---|
| JP | 2005317455 | 11/2005 |
| JP | 2007227171 | 9/2007 |
| JP | 2009021223 | 1/2009 |
| WO | 2008044430 A1 | 4/2008 |

OTHER PUBLICATIONS

Jeremy Robert Carlson, Larry Glenn Estes, Joseph Anthony Holung, Timothy Humphrey. Tin-Lup Wong, Bouziane Yebka, "Establishing Space Between End of Center Gas Pipe in Battery and Bottom of Battery Can" file history of related U.S. Appl. No. 12/033,339, filed Feb. 19, 2008.

Joseph Anthony Holung, Tin-Lup Wong, Bouziane Yebka, "Battery with Pressure Relief Channel," file history of related U.S. Appl. No. 12/252,794, filed Oct. 16, 2008.

Joseph Anthony Holung, Tin-Lup Wong, Bouziane Yebka, "Battery with Pressure Relief Channel," file history of related U.S. Appl. No. 13/427,186, filed Mar. 22, 2012.

Jeremy Robert Carlson, Larry Glenn Estes, Joseph Anthony Holung, Timothy Humphrey, Tin-Lup Wong, Bouziane Yebka, "Mitigating Rupture and Thermal Cascading of Battery Cells by Judicious Arrangement of Cells Inside a Pack" file history of related U.S. Appl. No. 12/049,337, filed Mar. 16, 2008.

Joseph Anthony Holung, Tin-Lup Wong, Bouziane Yebka, "Battery Cell Containment and Venting" file history of related U.S. Appl. No. 12/327,132, filed Dec. 3, 2008.

Jeremy Robert Carlson, Larry Glenn Estes, Joseph Anthony Holung, Timothy Humphrey, Tim-Lup Wong, Bouziane Yebka, "Established Space Between End of Center Gas Pipe in Battery and Bottom of Battery Can", file history of related U.S. Appl. No. 12/033,339, filed Feb. 19, 2008.

Joseph Anthony Holung, Tin-Lup Wong, Bouziane Yebka, "Battery With Pressure Relief Channel", file history of related U.S. Appl. No. 12/252,794, filed Oct. 16, 2008.

Joseph Anthony Holung, Tin-Lup Wong, Bouziane Yebka, "Battery With Pressure Relief Channel", file history of related U.S. Appl. No. 13/427,186, filed Mar. 22, 2012.

Joseph Anthony Holung, Tin-Lup Wong, Bouziane Yebka "Battery Cell Containment and Venting", file history of related U.S. Appl. No. 12/327,132, filed Dec. 3, 2008.

Jeremy Robert Carlson, Larry Glenn Estes, Joseph Anthony Holung: Timothy Humphrey, Tin-Lup Wong, Bouziane Yebka, "Mitigating Rupture and Thermal Cascading of Battery Cells by Judicious Arrangement of Cells Inside a Pack", file history of related U.S. Appl. No. 12/049,337, filed Mar. 16, 2008.

* cited by examiner

INPUT DEVICE WITH GAS VENT(S)

FIELD

The present application relates generally to input devices which vent gas from batteries in the input devices.

BACKGROUND

Modern styluses house batteries that power them. However, as recognized herein, sometimes gas pressure from a battery (e.g. that is malfunctioning) causes the stylus to heat, to explode, and/or to unintentionally eject the battery, which can cause injury to a user and damage to the stylus. There are currently no adequate ways to prevent injury and stylus damage under such conditions.

SUMMARY

Accordingly, in one aspect a stylus includes a first at least partially cylindrical element at least in part establishing a body of the stylus, and a second at least partially cylindrical element which telescopes with the first at least partially cylindrical element to permit gas to pass out of the stylus.

In another aspect, a method includes providing a battery housing in a stylus, where the battery housing positions a battery in the battery housing. The method also includes providing a vent on the stylus through which gas emitted from the battery may pass.

In still another aspect, an input device includes a housing, a processor in the housing, memory in the housing that is accessible to the processor, a contact element on the housing which provides input to a touch-enabled display, a battery compartment in the housing in which a battery may be positioned, and a vent through at least a portion of the housing which permits gas from the battery to pass to exterior to the housing.

The details of present principles, both as to their structure and operation, can best be understood in reference to the accompanying drawings, in which like reference numerals refer to like parts, and in which:

BRIEF DESCRIPTION OF THE DRAWINGS

FIG. 11B is an example cross-sectional view of a portion of the input device shown in FIG. 11A.

DETAILED DESCRIPTION

Figure 1:
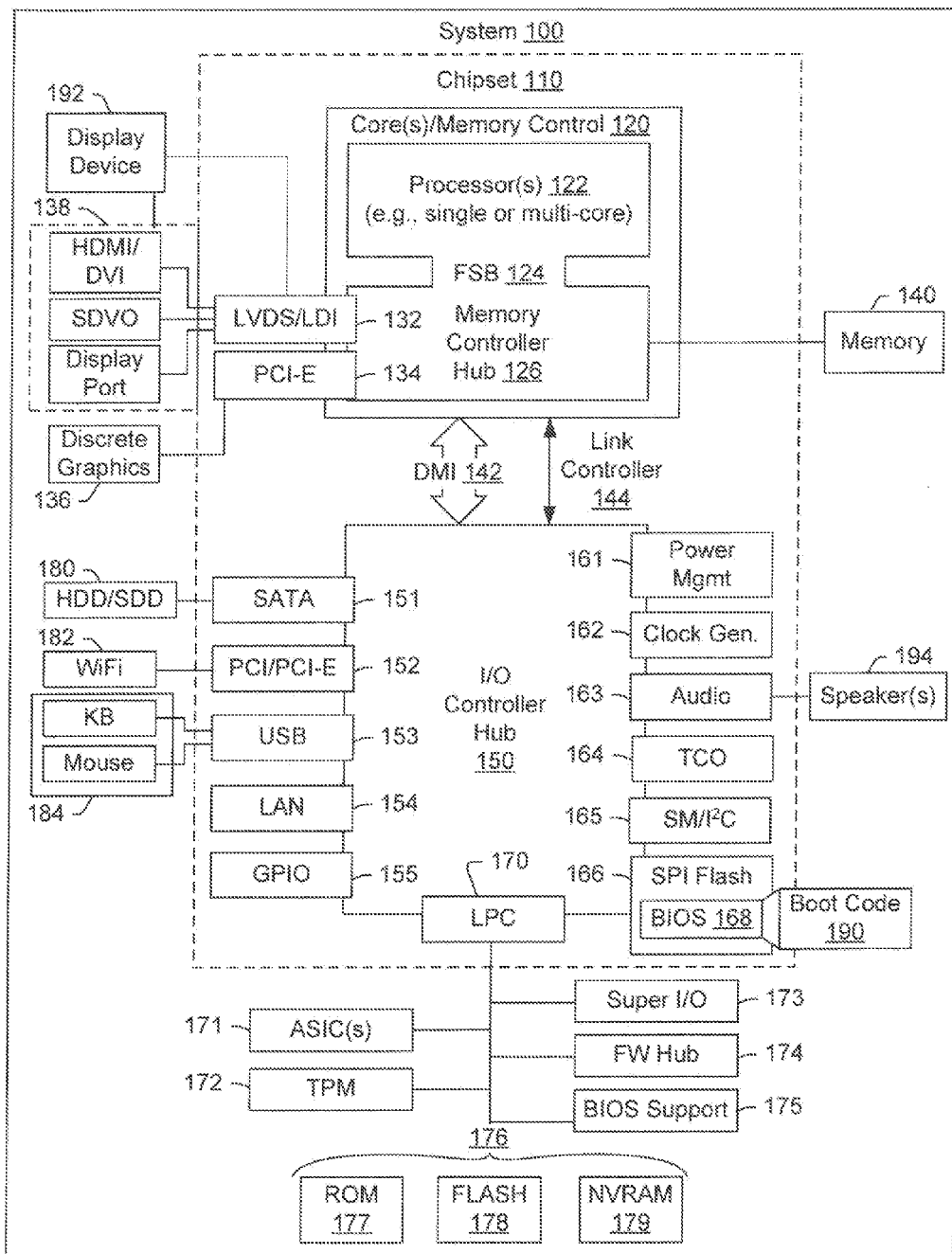
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shill registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B. C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad®, series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174. BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, a three-dimensional (3D) camera, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
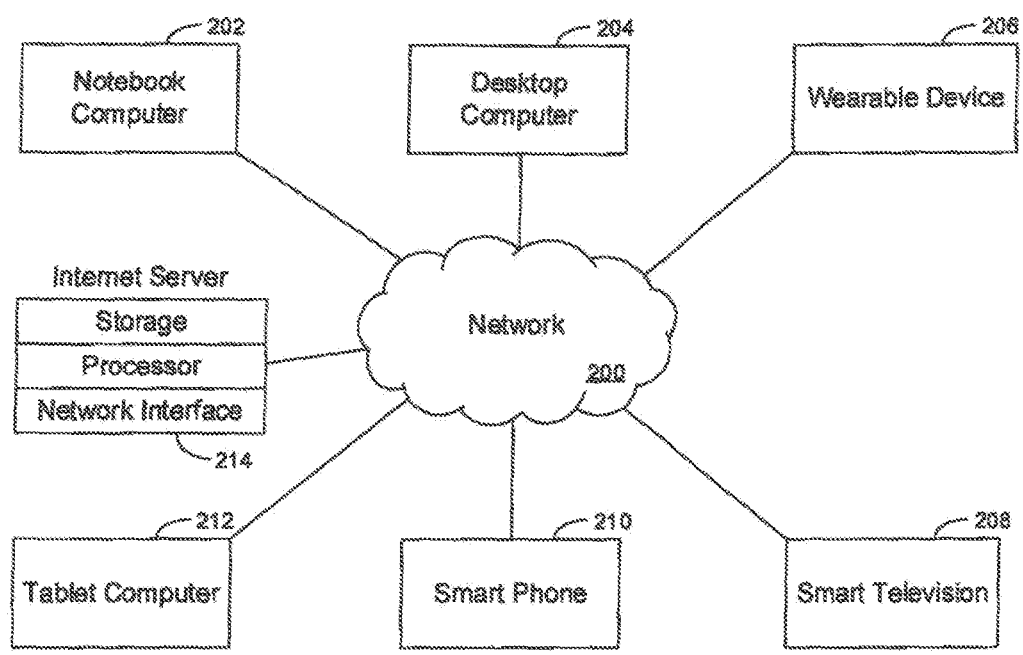
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 such as e.g. an Internet server that may e.g. provide cloud storage accessible to the devices 202-212. It is to be understood that the devices 202-214 are configured to communicate with each other and with the input devices disclosed herein over the network 200 to undertake present principles.

Figure 3A:
FIGS. 3A-10A, 11A, and 11B show example block diagrams of at least portions of input devices in accordance with present principles.

Referring to FIG. 3A, it shows an example (e.g. at least partially metallic) stylus 300 in accordance with present principles. The stylus 300 includes on its housing 302 a button 304 which may be manipulable by a user to provide input (e.g. left-click input) to another device with which the stylus 300 communicates (e.g. a tablet computer), as well as a tip 306 which may be manipulable to contact a touch-enabled display so that the stylus 300 provides input thereto based on the location of the display at which the tip 306 made contact. Still further, as may be appreciated from FIG. 3A, the housing 302 has been separated for insertion of one or more AAAA (e.g. lithium ion) batteries 308 into a battery chamber (not shown for clarity) in the housing 302 (e.g. the batteries being inserted end to end), where upon when the two portions of the housing 302 are rejoined, the batteries 308 may provide power to the stylus 300.

Figure 3B:
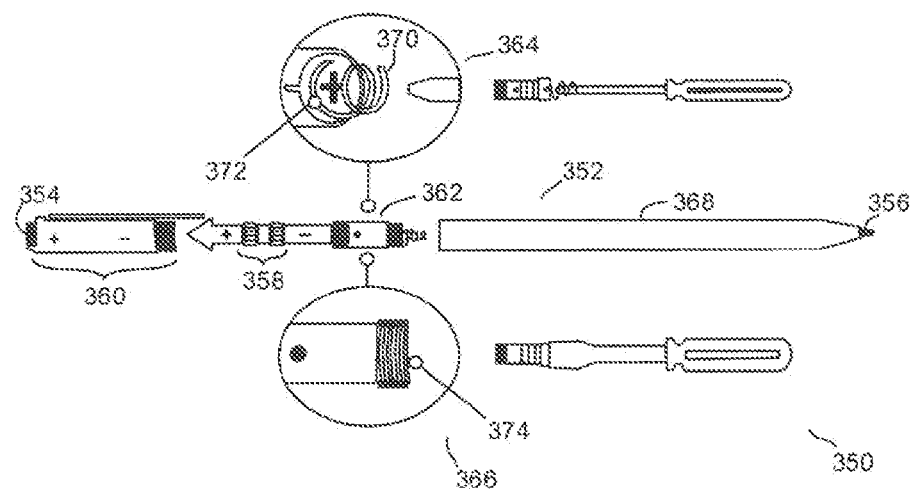

Now describing FIG. 3B, it shows an example stylus 350 in accordance with present principles. The stylus 350 includes on its housing 352 a button 354 which may be manipulable by a user to provide input (e.g. left-click input) to another device, as well as a tip 356 which may be manipulable to contact a touch-enabled display so that the stylus 350 provides input thereto based on the location of the display at which the tip 356 made contact. Still further, the housing 352 has been separated for insertion of one or more coin cell batteries (e.g. "watch" batteries) 358 into a battery casing and/or cartridge 362 disposable inside a left separated portion 360 of the housing 352 when the portions of the housing 352 that are separated as shown are joined back together. The casing 362 itself may be screwably engaged with the portion 360 such that unscrewing it from the portion 360 (e.g. using a Phillips or flathead screw driver as respectively shown in illustrations 364 and 366) permits access to the casing 362, and/or removal of the casing 362 from the portion 360, for insertion of one or more batteries into the casing 362. The casing 362 may then be screwed back in to the portion 360 for positioning of the casing 362 to permit the providing of power from the batteries 358 to the stylus 350.

Figure 4:
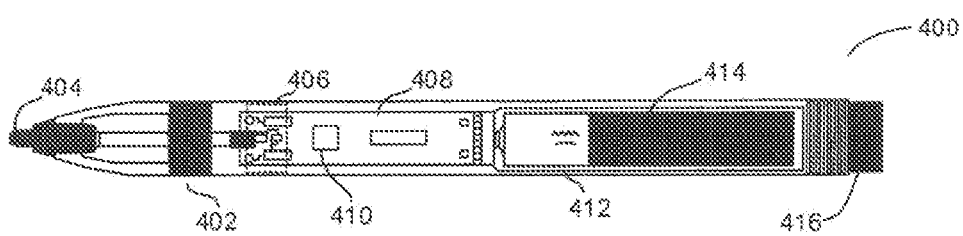

Furthermore, before moving on to the description of FIG. 4, note that the right portion 368 of the housing 352 may be screwably engageable with the left portion 360 (e.g. once the casing 362 has been properly screwed inside the portion 360) to join the respective housing portions 360 and 368 of the stylus 350. Also before describing FIG. 4, note that the Phillips screw driver notch 372 for screwing the casing 362 may be accessed using a Phillips screwdriver by extending the screw driver through the spring 370 shown and into the notch 372, while the flathead screwdriver notch 374 for screwing the casing 362 may be accessed by e.g. compressing the spring 370 so that the flathead screwdriver may extend into the notch 374.

Now in reference to FIG. 4, it shows another example stylus 400 in accordance with present principles. The stylus 400 includes a housing 402 from which protrudes a stylus tip and/or another element 404 configured to sense contact with another surface and/or provide input to a touch-enabled display. The stylus 400 also includes in the housing 402 an optical sensor 406 for e.g. sensing location and/or movement of the stylus relative to a touch-enabled display, sensing contact of the stylus 400 against a touch-enabled display to provide input thereto, sensing when a person is holding the stylus 400, sensing pressure exerted on the stylus 400 as applied by a user, etc.

The stylus 400 also includes in its housing 402 a printed circuit board (PCB) 408 on which e.g. an application specific integrated circuit (ASIC) 410 or another controller may be disposed. Still further, the housing 402 of the stylus 400 includes a battery chamber 412 in which a battery 414 for powering the stylus 400 may be positioned. Note that the battery 414 may be positioned in the housing 402 by removing the battery cap 416, inserting the battery 414, and repositioning the battery cap 416 in the end of the housing 404.

Figure 5A:
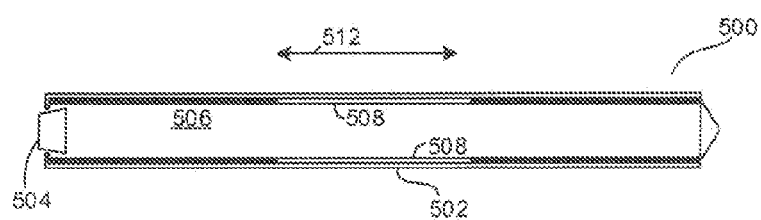
Figure 5B:
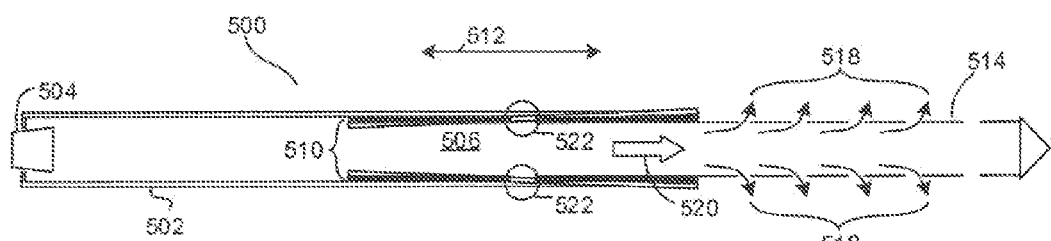

Continuing the detailed description in cross-reference to FIGS. 5A and 5B, they show block diagrams of an example input device 500 in accordance with present principles, with elements thereof removed for clarity. The device 500 includes a housing 502 having a tip 504 disposed at an end thereof for providing input to a touch-enabled display. The housing also includes a battery chamber 506 slideably engaged inside the housing 502 e.g. along a track 508 which may be (e.g. longitudinally) disposed along an inner circumference of at least a portion of the housing 502 in embodiments where the device 500 is at least partially cylindrical.

Furthermore, note that the chamber 506 has at least one end 510 with its circumference sloping progressively and obliquely inward away from the exterior of the housing 502 toward its respective end of the chamber 506 relative to a longitudinal axis 512 established by the device 500. Accordingly, it may be appreciated that owing to pressure buildup of gas emitted from at least one battery in the chamber 506 (the battery not being shown for clarity), the device 500 as shown in the "closed" position of FIG. 5A may transition to the "open" position shown in FIG. 5B in which the pressure created by the gas buildup causes at least a portion of the chamber 506 (e.g. a sheath portion and/or cylinder portion 514) which comprises gas vent perforations, vent ports, and/or vents 516 on at least a portion thereof to extend out of the housing 502 (e.g. the pressure may exert a force on one or more of the battery(s) in the chamber 506 and the chamber 506 itself) to vent gas through the portion 514, as represented by arrow 520, and out of the perforations 516 in the portion 514, as represented by the arrows 518. Note that this telescoping and/or sliding of the portion 514 at least partially out of the housing 502 may occur due to gas buildup, where the chamber 506 does not have a portion that under gas pressure extends out of the opposite end of the device 500 comprising the tip 504, so that gas pressure e.g. overcomes frictional force and/or an interference fit otherwise keeping the portion 514 disposed within the housing 502 (e.g. when positioned thereat by a user) to push the portion 514 at least partially out of the end of the device 500 opposite the end comprising the tip 504 to vent gas.

Thus, it is to be further understood that in at least some embodiments, owing to the end 510 of the chamber 506 sloping inward, and/or e.g. where the portion 514 is integral therewith, the battery(s) in the chamber 506 are forced (e.g. pushed by the sloped portion(s)) to move longitudinally within chamber 506 (e.g. and specifically the portion 514) as the chamber 506 moves toward the right end of the housing (relative to the perspective shown in the figures) and the portion 514 extends at least partially out of the housing 502 at least until at least a portion of the chamber 506 reaches point(s) 522 at which at least a portion of the chamber 506 and/or the portion 514 abuts a portion of the track 508 (e.g. that extends orthogonally into the housing 502 relative to the longitudinal axis 512) to thus prevent the chamber 506 from extending completely out of the housing 502 and becoming decoupled from the rest of the device 500.

Figure 6:
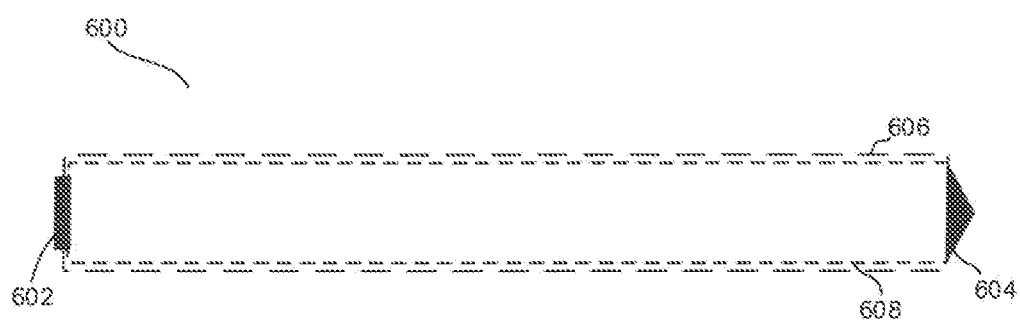

Now in reference to FIG. 6, it shows an example input device 600 (with elements omitted for clarity) having an input button 602 at one end and an input tip 604 at an opposing end of the device 600. Note that the device 600 comprises an outer cylinder 606 and an inner cylinder 608, with both cylinders 606 and 608 comprising at least one perforation, port, and/or vent through which gas emitted from a battery disposed inside the inner cylinder 608 may pass. It is to be understood in reference to the device 600 shown in FIG. 6 that the cylinders 606 and 608 slide relative to each other (e.g. the inner cylinder 608 may slide back and forth within the outer cylinder 606) e.g. under gas pressure from a battery (e.g. freely (e.g. save for frictional forces), and/or against spring bias from a spring) so that e.g. at least one perforation in the cylinder 606 at last partially aligns with at least one perforation in the cylinder 608 so that gas may pass through both perforations, when at least partially aligned, and out of the device 600.

Figure 7C:
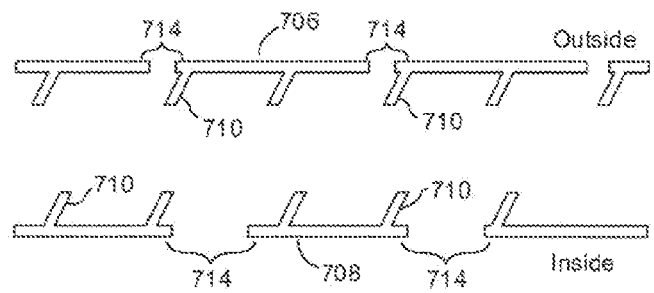
Figure 7A:
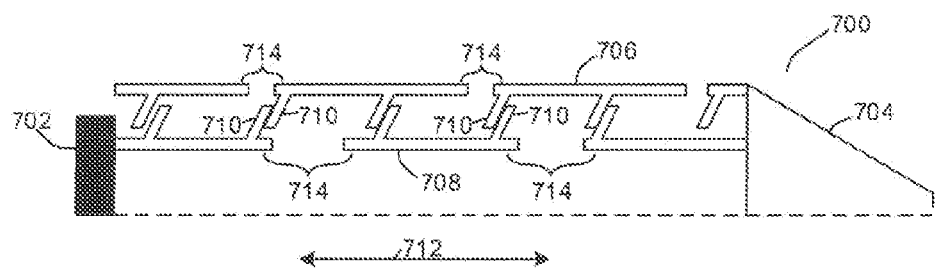
Figure 7B:
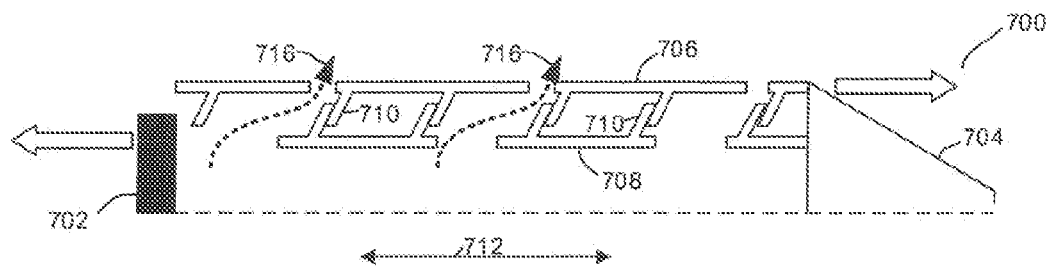

Continuing the detailed description in cross-reference to FIGS. 7A and 7B, they are block diagrams showing a partial view of an input device 700 in accordance with present principles. The device 700 comprises an input button 702 partially shown at one end and an input tip 704 partially shown at an opposing end of the device 700. Note that the device 700 comprises an outer wall 706 and an inner wall 708 respectively comprising at least one perforation, port, and/or vent 714 through which gas emitted from a battery disposed within the device 700 (e.g. within both walls 706 and 708) may pass.

Briefly in reference to FIG. 7C, it shows the outer wall 706 and inner wall 708 spaced separately apart for clarity (e.g. with "outside" as labeled understood to be exterior to the device 700 and "inside" as labeled understood to be interior to the inner wall 708 inside the device 700) rather than as they would be positioned on the device 700. It may be appreciated from FIG. 7C that both walls 706 and 708 comprise one or more respective teeth members and/or other protrusion elements 710 which may respectively protrude from longitudinal sides of the walls 706 and 708 respectively facing the side of the other respective wall 706 and 708. The elements 710 may protrude from respective sides of the walls 706 and 708 obliquely toward the other respective wall relative to a longitudinal axis 712 established by the device 700, and/or though not shown, may also protrude from respective sides orthogonally toward the other respective wall.

Again in cross-reference to FIGS. 7A and 7B, it is to be understood that the walls 706 and 708 telescope and/or slide relative to each other e.g. under gas pressure from a battery (e.g. freely (e.g. save for frictional forces) and/or against spring bias) so that e.g. at least one perforation 714 in the wall 706 at last partially aligns with at least one perforation 714 in the wall 708 so that gas may pass through both perforations when at least partially aligned and out of the device 700. An example of gas passing through the perforations 714 when they are aligned is represented by the arrows 716 shown in FIG. 78 (which may be thought of as an "open" position). However, when not aligned as shown in FIG. 7A (which may be thought of as a "closed" position), at least a portion of at least one of the walls 706 and 708 (e.g. the elements 710) blocks gas from passing from a battery inside of the wall 708 out of the device 700.

Figure 8A:
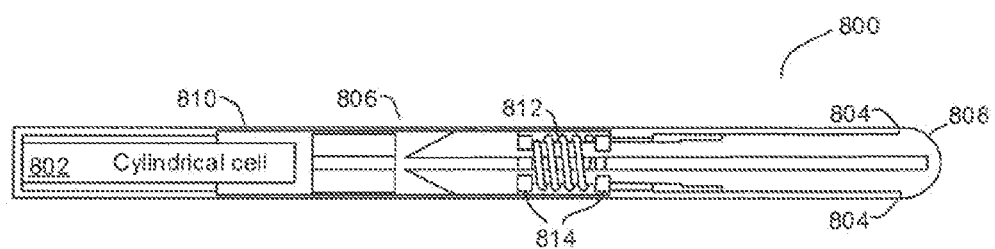
Figure 8B:
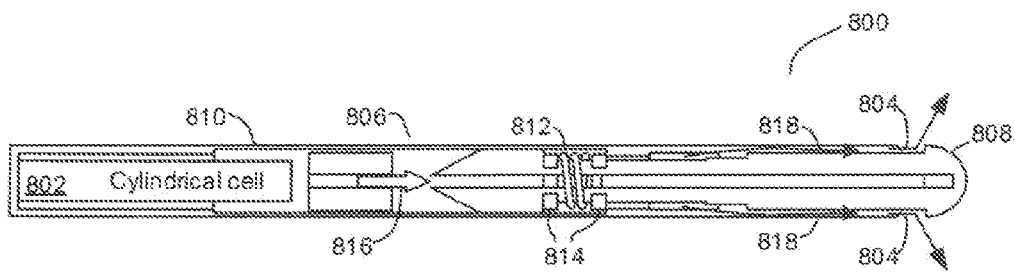

Moving on, cross-reference is now made to FIGS. 8A and 8B, which show another example input device 800 in accordance with present principles. The device 800 houses at least one battery 802. FIG. 8A is understood to show a configuration of the device 800) in which vents 804 in the housing 806 of the device 800 are closed and/or obstructed so that gas from the battery 802 may not travel to exterior to the device 800, while FIG. 8B is understood to show a configuration of the device 800 in which vents 804 in the housing 806 of the device 800 are open so that gas from the battery 802 may travel to exterior to the device 800. Note that an element 808 establishing one end of the device 800 (e.g. and forming part of the housing 806) protrudes at least partially into and telescopes with a segment 810 that at least in part establishes the housing 806.

Also note that the element 808 is biased to the closed position shown in FIG. 8A owing to spring bias exerted by spring 812 coupled (e.g. directly and/or via one or more intervening elements) to the element 808, where the spring 812 is also coupled to at least one other portion of the device 800, such as plates 814 coupled to opposing ends of the spring 812. Accordingly, in one example embodiment, the element 808 may be coupled at least to the plate 814 closest to the battery 802 (e.g. with the other plate 814 mounted to the segment 810).

As may be appreciated from FIG. 8A, when insufficient gas buildup and/or pressure from the battery 802 exists inside the housing 806 to push on the plate 814 closest to the battery 802 and at least partially overcome the spring bias of the spring 812, the device 800 remains in the closed configuration shown in FIG. 8A. However, upon sufficient gas buildup and/or pressure (e.g. when the battery 802 malfunctions) to overcome the spring bias of the spring 812 and push one of the plates 814 at least partially toward the other plate 814 (thus also causing the telescoping of the element 808 at least partially away from the segment 810 when e.g. the element 808 is coupled to the plate 814 closest to the battery 802), one or more fluid paths 820 are opened through which gas may travel from the battery 802 (through an inner chamber of the housing 806 as represented by arrow 816 in FIG. 8B), past the plates 814 and spring 812 (e.g. through a notch(es) exposed owing to the movement of the plate 814 closest to the battery 802), and then along an inside wall of the housing 806 (as represented by arrows 818) to the vents 804, such as e.g. between the inside wall of the segment 810 and an outer wall of the element 808.

Figure 8C:
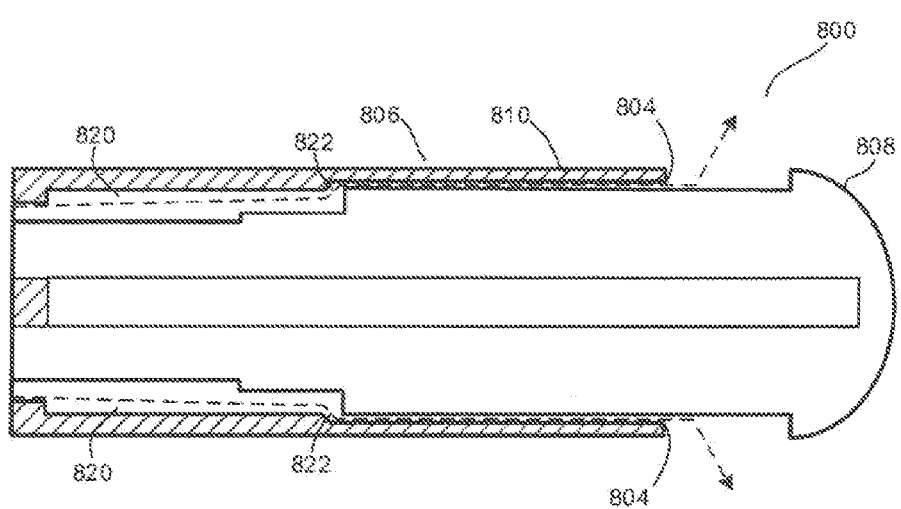

An expanded partial view of the fluid paths 820 through which gas may travel between the element 808 and segment 810 is shown in FIG. 8C, it being understood that the partial view of this figure shows the device 800 in the open configuration as shown in FIG. 8B, with the right portion of the device 800 past the spring 812 and plates 814 being shown in FIG. 8C relative to the presentation of the device 800 in FIGS. 8A and 8B. Note that while in some embodiments one or more portions of the paths 820 may remain unobstructed in both the open and closed configurations for the device 800, as may be appreciated from FIG. 8C, the paths 820 are nonetheless blocked at at least one location 822 based on at least partial telescoping of the element 808 toward the segment 810 so that portions thereof abut each other at the location 822, and are unblocked at the location 822 based on at least partial telescoping of the element 808 at least partially away from the segment 810 so that gas may travel to the vent 804 and out of the device 800.

Figure 9A:
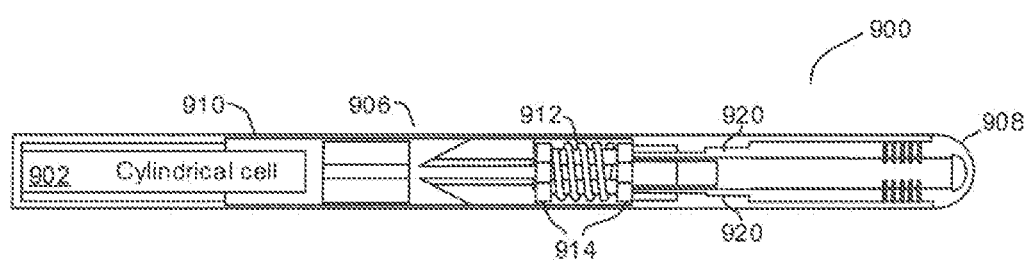
Figure 9B:
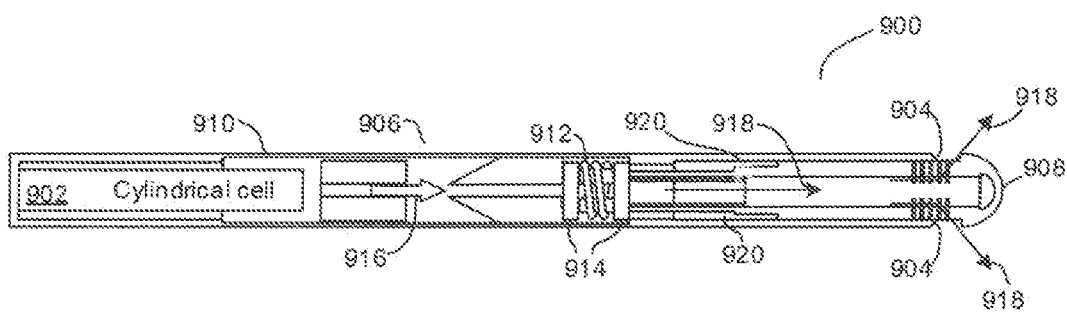

Continuing the detailed description in cross-reference to FIGS. 9A and 9B, they show yet another example input device 900 in accordance with present principles. The device 900) houses at least one battery 902. FIG. 9A is understood to show a configuration of the device 900 in which vents 904 of the device 900 are closed and/or obstructed so that gas from the battery 902 may not travel to exterior to the device 900, while FIG. 9B is understood to show a configuration of the device 900 in which vents 904 are unobstructed so that gas from the battery 902 may travel to exterior to the device 900. Note that the vents 904 are formed as part of an element 908 establishing one end of the device 900 (e.g. and forming part of the housing 906) that protrudes at least partially into and telescopes with a segment 910 that at least in part establishes a housing 906 of the device 900.

Furthermore, note that the element 908 is biased to the closed position shown in FIG. 9A owing to spring bias exerted by spring 912 coupled (e.g. directly and/or via one or more intervening elements) to the element 908, where the spring 912 is also coupled to at least one other portion of the device 900, such as plates 914 coupled to opposing ends of the spring 912. Accordingly, in one example embodiment, the element 908 may be coupled at least to the plate 914 closest to the battery 902 (e.g. with the other plate 914 mounted to the segment 910).

As may be appreciated from FIG. 9A, when insufficient gas buildup and/or pressure from the battery 902 exists inside the housing 906 to push on the plate 914 closest to the battery 902 and at least partially overcome the spring bias of the spring 912, the device 900 remains in the closed configuration shown in FIG. 9A. However, upon sufficient gas buildup and/or pressure (e.g. when the battery 902 malfunctions) to overcome the spring bias of the spring 912 and push one of the plates 914 at least partially toward the other plate 914 (thus also causing the telescoping and/or sliding of the element 908 at least partially away from the segment 910 when e.g. the element 908 is coupled to the plate 914 closest to the battery 902), one or more fluid paths 920 are opened through which gas may travel from the battery 902 (through an inner chamber of the housing 906 as represented by arrow 916 in FIG. 9B), past the plates 914 and spring 912 (e.g. through a notch(es) exposed owing to the movement of the plate 914 closest to the battery 902), and inside element 908 (as represented by arrows 918) to the vents 904 on the element 908.

Figure 9C:
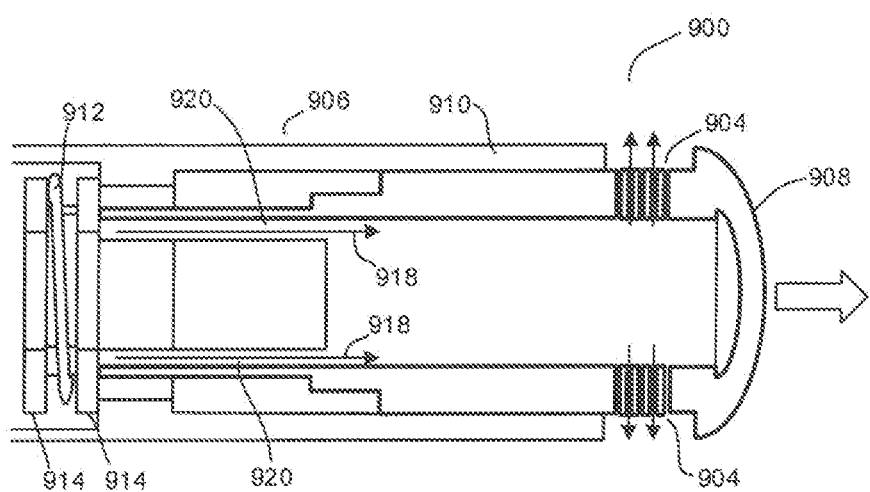

An expanded partial view of the fluid paths 920 through which gas may travel through the element 908 (e.g. after passing through the segment 910 and past the spring 912 and plates 914) is shown in FIG. 9C, it being understood that the partial view of this figure shows the device 900 in the open configuration as shown in FIG. 9B, with the right portion of the device 900 including the spring 912 and plates 914 being shown relative to the presentation of the device 900 in FIGS. 9A and 9B. Note that the vents 904 as shown in FIG. 9B are obstructed such that gas from the battery 902 cannot pass therethrough owing to e.g. the portion of the element 908 bearing the vents 904 abutting an inner wall of the segment 910 to block gas from passing from inside the element 908 through the vents 904 and out of the device 900. However, also note that the vents 904 as shown in FIGS. 9A and 9C are at least partially unobstructed such that gas from the battery 902 may pass from the battery 902 through the element 908 and out of the vents 904 on the element 908 owing to e.g. the portion of the element 908 bearing the vents 904 being telescoped away from the segment 910 so that at least one side thereof is exposed to air and hence can vent gas traveling through the vents 904 of the element 908.

Figure 10A:
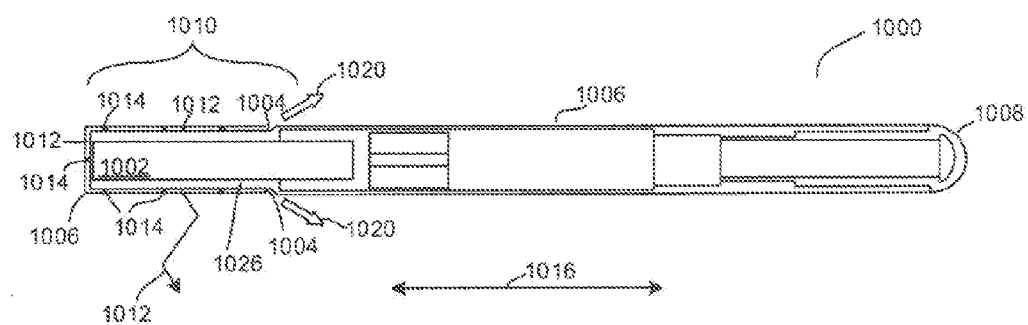
Figure 10B:
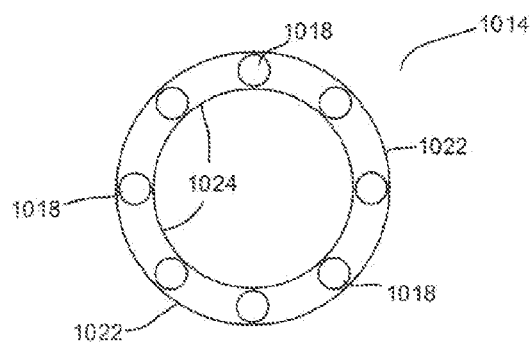

Moving on in the detailed description, cross-reference is now made to FIGS. 10A and 10B. These figures show another example input device 1000 in accordance with present principles, with FIG. 10A showing a block diagram of the input device 1000 and FIG. 10B showing a cross-sectional view of a portion of the device 1000.

Describing the device 1000 in more detail, it houses at least one battery 1002 in a housing 1006. As may best be appreciated from FIG. 10A, the device 1000 has vents 1004 for venting gas from the battery 1002 to outside of the device 1000. Note that the vents 1004 are "passive" in that they are open regardless of a telescoping and/or sliding of one portion of the device 1000 relative to another portion of the device 1000. Notwithstanding, it is to be understood that any of the telescoping embodiments described above may be combined with the embodiment shown in FIGS. 10A and 10B, and indeed any of the features of the embodiments described herein may be combined with each other as suitable for a given application of present principles. To that end, note that a telescoping element 1008 may be disposed on the device 1000.

In any case, note that at least a portion 1010 at least partially surrounding the battery 1002 (e.g. circumscribing at least the longitudinal shaft of the battery 1002 and/or surrounding respective ends of the battery 1002) comprises channels 1012 and dividers 1014. The channels 1012 permit gas emitted from the battery 1002 to flow therein, while the dividers 1014 may at least partially obstruct and/or be disposed between the channels 1012. Note, however, that the dividers may have one or more pathways 1018 through which gas may flow between the respective channels 1012.

Describing the dividers 1014 in more detail, they may circumscribe e.g. an inner (e.g. cylindrical) wall of the housing 1006 at respective cross-sections of the device 1002 such that the dividers 1014 e.g. establish respective planes e.g. orthogonal to a longitudinal axis 1016 established by the lengthwise dimension of the device 1000. Also note that the dividers 1014 when circumscribing an inner wall of the housing 1006 to thus abut the inner wall may also circumscribe, at the sections of the device 1000 at which the dividers 1014 are disposed, exterior portions of the battery 1002. Furthermore, as mentioned above and as may best be appreciated from FIG. 10B, the dividers 1014 may comprise one or more pathways 1018 through which gas emitted from the battery may flow between the respective channels 1012 and to the vents 1004 for venting the gas to outside the device 1000, as represented by arrows 1020 in FIG. 10A.

Again in reference to FIG. 10B, it is to be understood that an outer periphery 1022 of the divider 1014 that is shown circumscribes an inner wall of the housing 1006 (though it is to be understood that it need not necessarily do so), while an inner periphery 1024 of the divider 1014 circumscribes e.g. an exterior cross-section of the battery 1002 and/or an inner portion of the housing 1006 in which the battery 1002 is disposed (e.g. element 1026 of FIG. 10A).

Figure 11A:
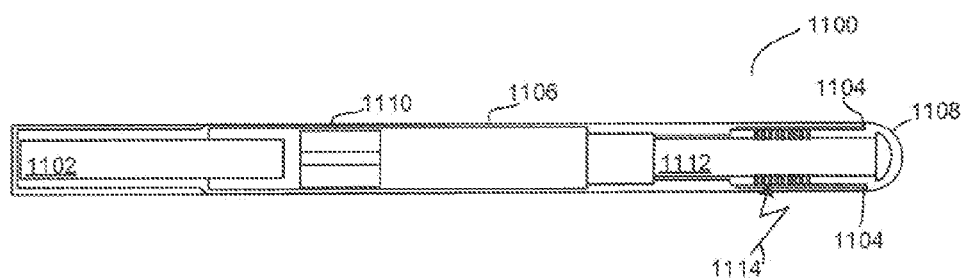
Figure 11B:
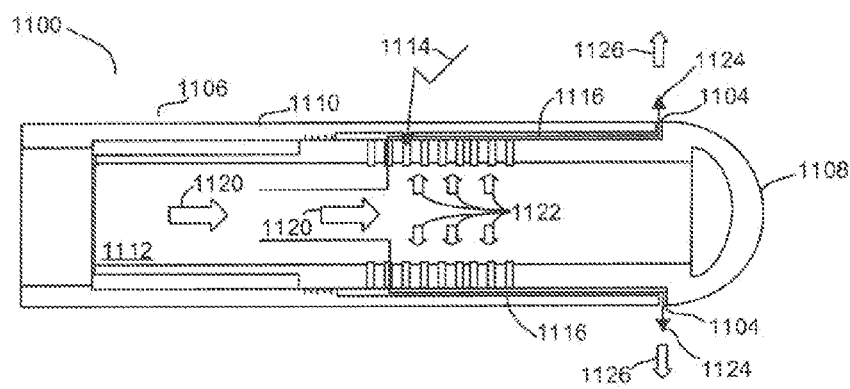

Now in cross-reference to FIGS. 11A and 11B, they show yet another example input device 1100 in accordance with present principles. The device 1100 houses at least one battery 1102. FIG. 11A is understood to show a configuration of the device 1100 in which vents 1104 of the device 1100 are closed and/or obstructed so that gas from the battery 1102 may not travel to exterior to the device 1100, while FIG. 11B is understood to a partial view of a configuration of the device 1100 in which vents 1104 are unobstructed so that gas from the battery 1102 may travel to exterior to the device 1100. Note that an element 1108 establishing one end of the device 1100 (e.g. and forming part of the housing 1106) protrudes at least partially into and telescopes with a segment 1110 that at least in part establishes a housing 1106. Also note that the element 1108 is biased to the closed position shown in FIG. 11A owing to e.g. spring bias exerted by a spring coupled (e.g. directly and/or via one or more intervening elements) to the element 1108 (the spring and/or corresponding plates not being shown for clarity), and/or may remain in at least some instances in the closed position owing to frictional force and/or interference fit otherwise keeping the element 1108 at least partially telescoped within the housing 1102 as shown in FIG. 11A (e.g. when positioned thereat by a user).

Further still, as may be appreciated from FIG. 11A, when insufficient gas buildup and/or pressure from the battery 1102 exists inside the housing 1106 to exert a force on the element 1108 to telescope it away from the rest of the housing 1106, the device 1100 remains in the closed configuration shown. However, upon sufficient gas buildup and/or pressure (e.g. when the battery 1102 malfunctions) due to e.g. an amount of gas emanating from the battery 1102, through the housing 1106, and into an inner chamber 1012 of the element 1108 to overcome the spring bias of the spring and/or frictional force (and/or interference fit) of the element 1108 within the rest of the housing 1106 (and in some embodiments, the segment 1110 specifically), the element 1108 telescopes at least partially away from the segment 1110 as shown in FIG. 11B.

Based on the element 1108 telescoping at least partially away from the segment 1110 as shown in FIG. 11B relative to its previous positioning as shown in FIG. 11A, one or more fluid channels 1114 become unobstructed so that gas may flow through other portions of the housing 1106 and into the chamber 1112 (as represented by arrows 1120), from the chamber 1112 through side portions/channels of the element 1108 (as represented by arrows 1122) into also now unobstructed gas passageways 1116 between the element 1108 and segment 1110, and outside the device 1110 via the vents 1104 in fluid communication with the passageways 1116 (as represented by arrows 1124 and 1126). Thus, it is to be understood that in the closed configuration shown in FIG. 11A, both the fluid channels 1114 and the passageways 1116 are blocked at at least some respective portions thereof (e.g. by respective portions of the segment 1110 and/or other portions of the housing 1106 which abut the channels 1114 and passageways 1116 in the closed configuration) so that gas may not pass respectively therethrough when the device 1100 is in the closed configuration of FIG. 11A.

Without reference to any particular figure, it is to be understood that an input device in accordance with present principles may include, on respective portions thereof (e.g., at respective ends thereof relative to a longitudinal axis established by the input device) vents similar to the vents 1004 described above which are "passive" in that they are configured for always permitting gas to pass therethrough regardless of a telescoping and/or sliding of one portion of the input device relative to another portion of the input device. Thus, in some example embodiments, one such vent may be disposed at a first end of the input device, and another such vent may be disposed at the other end of the input device. It is to be further understood that an input device as described in this paragraph may or may not comprise telescoping portions as described herein.

Also without reference to any particular figure, it is to be understood that portions of the housings described herein (e.g. the housing 502, and/or the segments 810, 910, and 1110) may retract away under gas pressure relative respectively to other telescoping elements described herein (e.g. the portion 504, and/or the elements 808, 908, and 1108), and/or those telescoping elements may telescope away from the segments under gas pressure, but in either case at least some of the embodiments disclosed herein are understood to telescope relative to each other to permit gas to pass out of the respective input devices.

Still without reference to any particular figure, it is to be understood that different types of batteries may be used in accordance with present principles, including but not limited to e.g. AAA cylindrical batteries, AAAA cylindrical coin cell batteries and/or other so-called "micro-cylindrical" batteries, non-cylindrical batteries, etc.

In addition, it is to be understood that present principles apply to devices other than styluses as well, such as e.g. mice, laser pointers, wearable devices, tablet computers and/or convertible computers, flash lights, etc.

While the particular INPUT DEVICE WITH GAS VENT(S) is herein shown and described in detail, it is to be understood that the subject matter which is encompassed by the present application is limited only by the claims.

What is claimed is:
1. A stylus, comprising:
   a first at least partially cylindrical element at least in part establishing a body of the stylus; and
   a second at least partially cylindrical element which telescopes with the first at least partially cylindrical element to permit gas to pass out of the stylus;
   wherein at least a portion of the second at least partially cylindrical element telescopes at least partially inside the first at least partially cylindrical element, and wherein at least a portion of the second at least partially cylindrical element telescopes at least partially away from the first at least partially cylindrical element under pressure of gas from at least one battery positioned in the stylus to permit gas to pass through a vent out of the stylus.
2. The stylus of claim 1, comprising:
   a battery chamber for housing the at least one battery; and
   a path which fluidly connects the battery chamber to the vent, wherein the vent permits gas to pass out of the stylus at least while the second at least partially cylin- drical element is telescoped at least partially away from the first at least partially cylindrical element.

3. The stylus of claim 2, wherein the path is blockable at least in part based on positioning of at least a portion of the first at least partially cylindrical element against at least a portion of the second at least partially cylindrical element.

4. The stylus of claim 3, wherein at least a portion of the first at least partially cylindrical element is positionable against at least a portion of the second at least partially cylindrical element to block the path at least in part based on user-applied force of one of the first and second at least partially cylindrical element toward the other of the first and second at least partially cylindrical element.

5. The stylus of claim 3, wherein at least a portion of the first at least partially cylindrical element is positionable against at least a portion of the second at least partially cylindrical element to block the path at least in part based on spring bias of a spring in the stylus which pushes at least a portion of at least one of the first and second at least partially cylindrical elements toward at least a portion of the other of the first and second at least partially cylindrical elements.

6. The stylus of claim 2, wherein the battery chamber houses at least one at least partially cylindrical battery.

7. The stylus of claim 2, wherein at least a portion of the path is parallel to a longitudinal axis defined by the stylus.

8. The stylus of claim 2, wherein at least a portion of the first at least partially cylindrical element that is orthogonal to a longitudinal axis defined by the stylus abuts at least a portion of the second at least partially cylindrical element to block the path.

9. The stylus of claim 1, wherein the second at least partially cylindrical element at least in part houses the at least one battery.

10. The stylus of claim 9, wherein the second at least partially cylindrical element which houses the at least one battery narrows at least at a portion thereof, and wherein the narrowed portion of the second at least partially cylindrical element exerts a force on the at least one battery during the telescoping of the second at least partially cylindrical element at least partially away from the first at least partially cylindrical element to move the at least one battery with the second at least partially cylindrical element as the second at least partially cylindrical element telescopes at least partially away from the first at least partially cylindrical element.

11. The stylus of claim 1, wherein the vent is established between the first at least partially cylindrical element and the second at least partially cylindrical element.

12. The stylus of claim 1, wherein the vent is a first vent established between the first at least partially cylindrical element and the second at least partially cylindrical element, and wherein the stylus comprises at least a second vent in the first at least partially cylindrical element through which gas may also pass to out the stylus.

13. The stylus of claim 1, wherein the vent is in the second at least partially cylindrical element.

14. The stylus of claim 1, wherein the vent is a first vent established between the first at least partially cylindrical element and the second at least partially cylindrical element, and wherein the stylus comprises at least a second vent in the second at least partially cylindrical element which fluidly connects to the first vent for gas to pass out the stylus.

15. A method, comprising:
providing a battery housing in a stylus, wherein the battery housing positions at least one battery in the battery housing; and
providing a vent on the stylus through which gas emitted from the at least one battery may pass;
wherein the stylus comprises a first at least partially cylindrical element at least in part establishing a body of the stylus and comprises a second at least partially cylindrical element, wherein at least a portion of the second at least partially cylindrical element telescopes at least partially inside the first at least partially cylindrical element, and wherein at least a portion of the second at least partially cylindrical element telescopes at least partially away from the first at least partially cylindrical element under pressure of gas from the at least one battery to permit gas to pass through the vent out of the stylus.

16. The method of claim 15, comprising:
providing at least one path from the battery housing to the vent through which gas emitted from the at least one battery may pass from the battery housing to the vent.

17. The method of claim 15, wherein at least a portion of the first at least partially cylindrical element is positionable against at least a portion of the second at least partially cylindrical element to block a path for gas to pass to the vent at least in part based on spring bias of a spring in the stylus which pushes at least a portion of at least one of the first and second at least partially cylindrical elements toward at least a portion of the other of the first and second at least partially cylindrical elements.

18. The method of claim 15, wherein the second at least partially cylindrical element comprises the battery housing and the at least one battery is positionable in the second at least partially cylindrical element, and wherein the second at least partially cylindrical element exerts a force on the at least one battery during the telescoping of at least the portion of the second at least partially cylindrical element at least partially away from the first at least partially cylindrical element to move the at least one battery with the second at least partially cylindrical element as at least the portion of the second at least partially cylindrical element telescopes at least partially away from the first at least partially cylindrical element.

19. An input device, comprising:
a housing;
a processor in the housing;
storage which is accessible to the processor, wherein the storage is in the housing;
a contact element on the housing which provides input to a touch-enabled display;
a battery compartment in the housing in which a battery may be positioned; and
a vent through at least a portion of the housing which permits gas from the battery to pass to exterior to the housing;
wherein the housing comprises at least a first portion and a second portion, wherein at least part of the second portion telescopes at least partially inside the first portion, and wherein at least part of the second portion is slideably engaged with the first portion for the second portion to slide at least partially away from the first portion under pressure of gas generated by the battery to at least in part permit gas generated by the battery to travel to the vent and to pass through the vent to exterior to the housing.

20. The input device of claim 19, wherein the input device comprises opposing ends relative to a longitudinal axis established by the input device, wherein the vent is a first vent disposed at a first end of the opposing ends, and wherein the input device comprises a second vent disposed at a second end of the opposing ends different from the first end.

* * * * *